(12) United States Patent
Zhang et al.

(10) Patent No.: US 12,363,648 B2
(45) Date of Patent: Jul. 15, 2025

(54) POWER HEADROOM REPORTING FOR MULTI-BEAM UPLINK TRANSMISSIONS

(71) Applicant: APPLE INC., Cupertino, CA (US)

(72) Inventors: Yushu Zhang, Beijing (CN);
Chunxuan Ye, San Diego, CA (US);
Dawei Zhang, Saratoga, CA (US);
Haitong Sun, Cupertino, CA (US);
Hong He, San Jose, CA (US); Huaning Niu, San Jose, CA (US); Sigen Ye, Whitehouse Station, NJ (US); Wei Zeng, Saratoga, CA (US); Weidong Yang, San Diego, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/441,657

(22) PCT Filed: Jul. 23, 2021

(86) PCT No.: PCT/CN2021/108288
§ 371 (c)(1),
(2) Date: Sep. 21, 2021

(87) PCT Pub. No.: WO2023/000344
PCT Pub. Date: Jan. 26, 2023

(65) Prior Publication Data
US 2024/0031948 A1 Jan. 25, 2024

(51) Int. Cl.
*H04W 52/36* (2009.01)
*H04W 52/14* (2009.01)

(52) U.S. Cl.
CPC ....... *H04W 52/365* (2013.01); *H04W 52/146* (2013.01)

(58) Field of Classification Search
CPC .............. H04W 52/365; H04W 52/146
See application file for complete search history.

(56) References Cited

U.S. PATENT DOCUMENTS

| | | | |
|---|---|---|---|
| 9,585,107 B2 | 2/2017 | Xu et al. | |
| 2016/0330698 A1* | 11/2016 | Loehr | H04W 52/241 |
| 2016/0353440 A1* | 12/2016 | Lee | H04W 72/0453 |
| 2018/0124710 A1* | 5/2018 | Ly | H04L 5/0007 |
| 2018/0368081 A1* | 12/2018 | Akkarakaran | H04W 52/365 |
| 2019/0174432 A1* | 6/2019 | Wang | H04W 72/21 |
| 2019/0306874 A1 | 10/2019 | Lohr et al. | |
| 2020/0267667 A1* | 8/2020 | MolavianJazi | H04W 52/365 |

(Continued)

FOREIGN PATENT DOCUMENTS

| | | |
|---|---|---|
| CN | 110475334 | 11/2019 |
| WO | 2020164619 | 8/2020 |

OTHER PUBLICATIONS

Article entitled, "Enhancements on Multi-Beam Operation", R1-2105540, 3GPP TSG RAN WG1 #105-e, Xiaomi, dated May 27, 2021 in 12 pages.

(Continued)

*Primary Examiner* — Junpeng Chen
(74) *Attorney, Agent, or Firm* — Kilpatrick Townsend & Stockton LLP

(57) ABSTRACT

The present application relates to devices and components including apparatus, systems, and methods for providing a power headroom report with respect to repetitions of uplink data transmissions with different beams in wireless communication systems.

13 Claims, 12 Drawing Sheets

(56) References Cited

U.S. PATENT DOCUMENTS

| | | |
|---|---|---|
| 2021/0007139 A1 | 1/2021 | Fu et al. |
| 2022/0060998 A1* | 2/2022 | Khoshnevisan .... H04W 52/365 |
| 2022/0210748 A1* | 6/2022 | Huang ................ H04W 52/365 |
| 2022/0217653 A1* | 7/2022 | Kung ..................... H04L 5/0048 |
| 2022/0225247 A1* | 7/2022 | Huang ................... H04W 52/34 |
| 2022/0256571 A1* | 8/2022 | Lo ...................... H04W 72/1273 |
| 2022/0338042 A1* | 10/2022 | Cirik ..................... H04L 1/1854 |
| 2023/0156627 A1* | 5/2023 | Yuan ................... H04W 52/365 370/318 |
| 2023/0291451 A1* | 9/2023 | Su ............................. H04L 1/08 |

OTHER PUBLICATIONS

Article entitled, "Summary #3 of Multi-TRP PUCCH and PUSCH Enhancements", R1-200XXXX, 3GPP TSG RAN WG1 #105-e, Moderator (Nokia, Nokia Shanghai Bell), dated May 27, 2021 in 10 pages.

International Search Report and Written Opinion issued in PCT Application No. PCT/CN2021/108288, dated Mar. 30, 2022 in 10 pages.

Article entitled, "Physical layer procedures for control" (3GPP TS 38.213 version 16.5.0 Release 16); 5G; NR; Technical Specification; ETSI TS 138 213 V16.5.0 (Apr. 2021); Reference RTS/TSGR-0138213vg50 in 188 pages. [cited for section 7.7].

Article entitled, "Medium Access Control (MAC) protocol specification" (3GPP TS 38.321 version 16.4.0 Release 16); 5G; NR; Technical Specification; ETSI TS 138 321 V16.4.0 (Apr. 2021); Reference RTS/TSGR-0238321vg40 in 159 pages. [cited for section 5.4.6].

International Preliminary Report on Patentability issued in PCT Application No. PCT/CN2021/108288, dated Feb. 1, 2024 in 6 pages.

Technical Specification Report, "3GPP TS 38.133 V17.3.0", 3rd Generation Partnership Project; Technical Specification Group Radio Access Network; NR; Requirements for support of radio resource management (Release 17), dated Sep. 2021 in 3207 pages.

Technical Specification Report, "3GPP TS 38.213 V16.7.0", 3rd Generation Partnership Project; Technical Specification Group Radio Access Network; NR; Physical layer, Procedures for Control (Release 16), dated Sep. 2021 in 188 pages.

Technical Specification, "3GPP TS 38.321 V16.7.0", 3rd Generation Partnership Project; Technical Specification Group Radio Access Network; NR; Medium Access Control (MAC) protocol specification (Release 16), dated Dec. 2021 in 158 pages.

Technical Specification, "3GPP TS 38.331 V16.7.0", 3rd Generation Partnership Project; Technical Specification Group Radio Access Network; NR; Radio Resource Control (RRC) protocol specification (Release 16), dated Dec. 2021 in 963 pages.

Status Report to TSG, "3GPP TSG RAN Meeting #94-e", Electronic Meeting, RP-213478, dated Dec. 6-17, 2021 in 28 pages.

Technical Report, "Moderator Summary#5 for Multi-beam Enhancement: Round 4", Agenda item: 8.1.1, Moderator (Samsung), 3GPP TSG RAN WG1 #106-e R1-210xxxx, dated Aug. 16-27, 2021 in 18 pages.

Technical Report, "Revised WID: Further Enhancements on MIMO for NR", Agenda item 9.3.1.1, Samsung, 3GPP TSG RAN Meeting #93e, RP-212535, dated Sep. 13-17, 2021 in 6 pages.

Discussion/Decision Report, "Summary of UE Features for further Enhancements on NR-MIMO", Moderator (AT&T), 3GPP TSG RAN WG1 #106bis-e, R1-2109912, dated Oct. 11-19, 2021 in 118 pages.

Technical Specification entitled: 3rd Generation Partnership Project; Technical Specification Group Radio Access Network; NR; Physical layer procedures for control (Release 16); 3GPP TS 38.213 V16.6.0 (Jun. 2021) in 187 pages.

Discussion/Decision Document entitled, "Enhancements on Multi-TRP for PDCCH, PUCCH and PUSCH", Source: Qualcomm Incorporated, Agenda item: 8.1.2.1, 3rd Generation Partnership Project, Technical Specification Group, Radio Access Network, Working Group1 Meeting #105-bis-e, R1-2104655, May 10-27, 2021in 17 pages.

Discussion/Decision Document entitled, "Summary #2 of Multi-TRP PUCCH and PUSCH Enhancements", Source: Moderator (Nokia, Nokia Shanghai Bell), Agenda item: 8.1.2.1, 3rd Generation Partnership Project, Technical Specification Group, Radio Access Network, Working Group1 #105-e, R1-2106074, May 19-27, 2021 in 47 pages.

Extended European Search Report issued in European Application No. 21950593.0, dated Mar. 7, 2025 in 9 pages.

Technical Specification entitled, "Enhancements on Multi-TRP for PDCCH, PUCCH and PUSCH", 3rd Generation Partnership Project, Technical Specification Group, Radio Access Network, Working Group1 Meeting #105-bis-e, R1-2104655, dated May 10-27, 2021 in 17 pages.

Technical Specification entitled, "Summary #2 of Multi-TRP PUCCH and PUSCH Enhancements", 3rd Generation Partnership Project, Technical Specification Group, Radio Access Network, Working Group1 #105-e, R1-2106074, dated May 19-27, 2021 in 47 pages.

Extended European Search Report issued in European Application No. EP21950593.0, dated Mar. 7, 2025 in 9 pages.

* cited by examiner

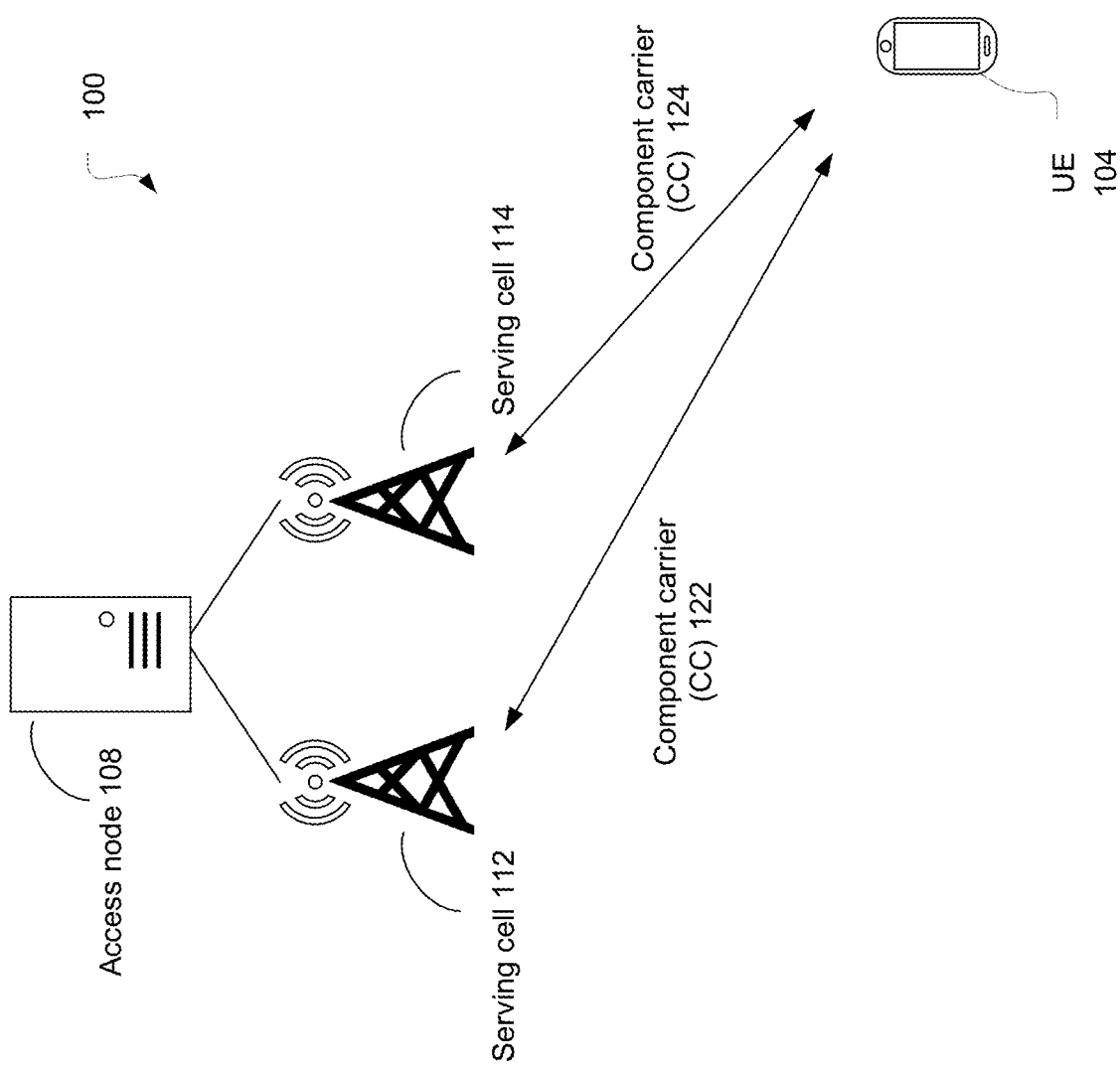

$$PH_{\text{type1},b,f,c}(i,j,q_d,l) = P_{\text{CMAX},f,c}(i) -$$
$$\{P_{\text{O\_PUSCH},b,f,c}(j) + 10\log_{10}(2^{\mu} \cdot M_{\text{RB},b,f,c}^{\text{PUSCH}}(i)) +$$
$$\alpha_{b,f,c}(j) \cdot PL_{b,f,c}(q_d) + \Delta_{\text{TF},b,f,c}(i) + f_{b,f,c}(i,l)\}$$

Figure 2A $$PH_{\text{type1},b,f,c}(i,j,q_d,l) = \tilde{P}_{\text{CMAX},f,c}(i) -$$
$$\{P_{\text{O\_PUSCH},b,f,c}(j) + \alpha_{b,f,c}(j) \cdot PL_{b,f,c}(q_d) + f_{b,f,c}(i,l)\}$$

Figure 2B

POWER HEADROOM REPORTING FOR MULTI-BEAM UPLINK TRANSMISSIONS

This application is a 35 U.S.C. § 371 National Stage Entry of International Application No. PCT/CN2021/108288, filed on Jul. 23, 2021, which is incorporated herein by reference in its entirety for all purposes.

BACKGROUND

Third Generation Partnership Project (3GPP) Fifth Generation (5G) New Radio (NR) networks may implement uplink data transmissions with repetitions, which may support lower latency and/or higher reliability.

BRIEF DESCRIPTION OF THE DRAWINGS

FIG. 1 shows a network environment in accordance with some embodiments.

FIG. 2A shows an expression for a power headroom report (PHR) that is based on an actual physical uplink scheduled channel (PUSCH) transmission.

FIG. 2B shows an expression for a PHR that is based on a reference PUSCH transmission.

DETAILED DESCRIPTION

Figure 3:
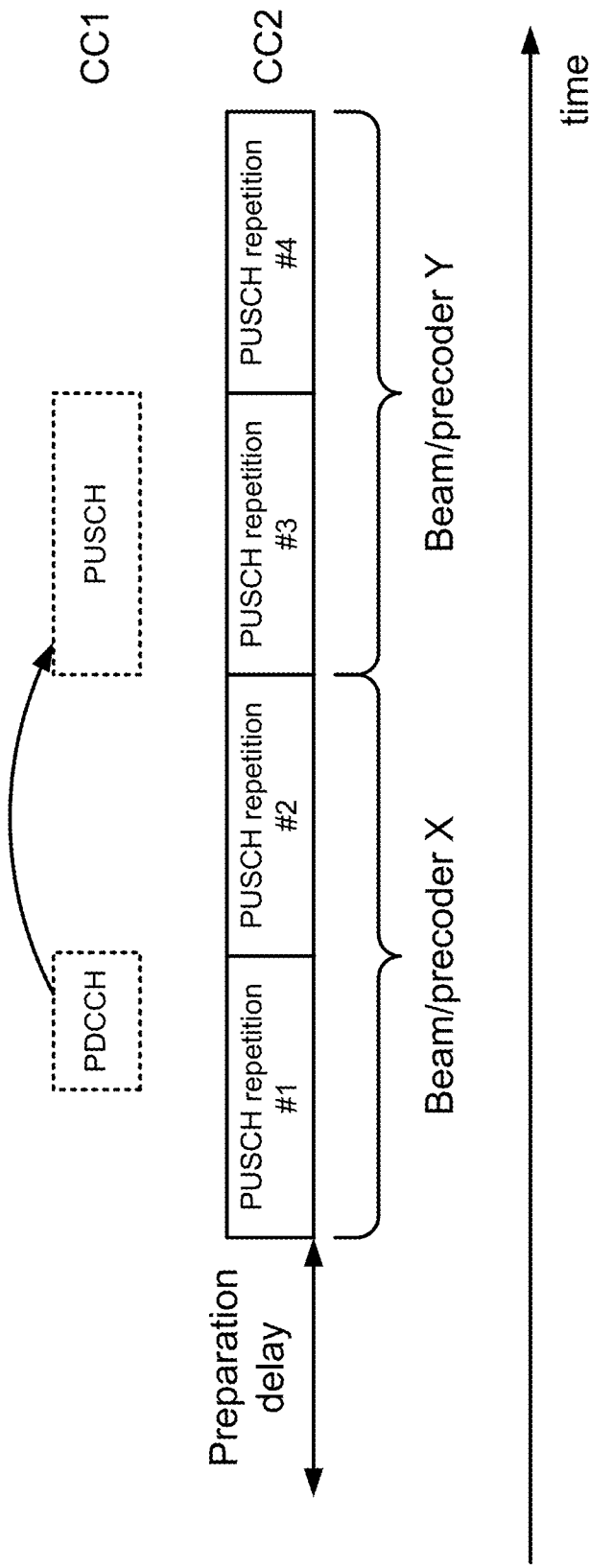
FIG. 3 illustrates an example of uplink transmissions to support descriptions of various embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

For the purposes of the present document, the phrase "A is based on B" means "A is based on at least B".

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radiofrequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements. The term "obtaining" is used to indicate any of its ordinary meanings, such as calculating, deriving, receiving (e.g., from another element or device), and/or retrieving (e.g., from an array of storage elements).

Techniques for providing a power headroom report are described with respect to repetitions of uplink data transmissions with different beams. FIG. 1 illustrates a network environment 100 in accordance with some embodiments. The network environment 100 may include a UE 104 and an access node (or "base station") 108. The access node 108 may provide one or more wireless serving cells 112 and 114, for example, 3GPP New Radio (NR) cells, through which the UE 104 may communicate with the access node 108 (e.g., over an NR-Uu interface). In some aspects, the access node 108 is a Next Generation NodeB (gNB) that provides one or more 3GPP NR cells.

The access node (or "base station") 108, which may be a gNB, may transmit information (for example, data and control signaling) in the downlink direction by mapping logical channels on the transport channels, and transport channels onto physical channels. The logical channels may transfer data between a radio link control (RLC) and media access control (MAC) layers; the transport channels may transfer data between the MAC and PHY layers; and the physical channels may transfer information across the air interface. The physical channels may include a physical broadcast channel (PBCH); a physical downlink shared channel (PDSCH); and a physical downlink control channel (PDCCH).

The PBCH may be used to broadcast system information that the UE 104 may use for initial access to a serving cell. The PBCH may be transmitted along with physical synchronization signals (PSS) and secondary synchronization signals (SSS) in a synchronization signal (SS)/PBCH block. The SS/PBCH blocks (SSBs) may be used by the UE 104 during a cell search procedure and for beam selection.

The PDSCH may be used to transfer end-user application data, signaling radio bearer (SRB) messages, system information messages (other than, for example, a Master Information Block (MIB)), and paging messages.

The access node 108 (e.g., base station or gNB) may use a PDCCH to transmit downlink control information (DCI) to the UE 104. The DCI may provide uplink resource allocations on a physical uplink shared channel (PUSCH), downlink resource allocations on a PDSCH, and various other control information. The DCI may also be used to provide uplink power control commands, configure a slot format, or indicate that preemption has occurred.

The access node (e.g., base station or gNB) 108 may also transmit various reference signals to the UE 104. A Reference Signal (RS) is a special signal that exists only at PHY layer and is not for delivering any specific information (e.g., data), but whose purpose instead is to deliver a reference point for transmitted power. The reference signals may include demodulation reference signals (DMRSs) for the PBCH, PDCCH, and PDSCH. The UE 104 may compare a received version of the DMRS with a known DMRS sequence that was transmitted to estimate an impact of the propagation channel. The UE 104 may then apply an inverse of the propagation channel during a demodulation process of a corresponding physical channel transmission.

The reference signals may also include channel state information-reference signals (CSI-RS). The CSI-RS may be a multi-purpose downlink transmission that may be used for CSI reporting, beam management, connected mode mobility, radio link failure detection, beam failure detection and recovery, and fine tuning of time and frequency synchronization. For example, the SSBs and CSI-RSs may be measured by the UE 104 to determine the desired downlink beam pair for transmitting/receiving PDCCH and PDSCH transmissions. The UE 104 may use a Physical Uplink Control Channel (PUCCH) to transmit uplink control information (UCI) to the access node 108, including, for example, hybrid-automatic repeat request (HARD) acknowledgements, scheduling requests, and periodic and semi-persistent channel state information (CSI) reports.

The UE 104 may include enhanced Multiple-Input-Multiple-Output (eMIMO) capabilities that support simultaneous communication over beams from several (or even many) different serving cells. FIG. 1 shows an example of carrier aggregation (CA), in which the UE 104 communicates information with an access node 108 through serving cell 112 over a component carrier (CC) 122 and through serving cell 114 over a component carrier (CC) 124.

The CC 122 may be in a band in Frequency Range 1 (FR1) or in Frequency Range 2 (FR2). Likewise the CC 124 may be in a band in FR1 or in FR2. The CCs 122 and 124 may be in the same band (intra-band, either contiguous or non-contiguous) or may be in different bands (inter-band) and possibly different frequency ranges. For FR1 (e.g., below 7.225 GHz), a transmit antenna of the UE 104 is typically implemented as an omnidirectional antenna. For FR2 (e.g., 24.250 GHz and above, also called mmWave), a transmit antenna of the UE 104 may be implemented as a panel having multiple antenna elements. For example, the multiple antenna elements of a panel may be driven as a phased array (e.g., to direct a beam in a desired direction).

A 5G network may implement PUSCH repetition Type A, which supports repetitions of a PUSCH transmission in consecutive slots. Additionally or alternatively, a 5G network may implement PUSCH repetition Type B, which supports multiple repetitions of a PUSCH transmission in one slot and/or repetitions of the same PUSCH transmission across multiple slots. PUSCH repetition Type B may be used, for example, to achieve a desired level of low latency and/or high reliability. A UE 104 may transmit repetitions of a PUSCH transmission within the same slot and/or on the same CC as other uplink transmission instances. For example, the UE 104 may transmit the repetitions within the same slot and/or on the same CC as one or more regular PUSCH transmissions. Additionally or alternatively, the UE 104 may transmit repetitions of a PUSCH transmission within the same slot and/or on the same CC as repetitions of another PUSCH transmission. The UE may transmit uplink transmission instances on the same uplink beam or on different uplink beams. For example, the UE may transmit the repetitions of a PUSCH transmission on the same uplink beam or on different uplink beams. A UE 104 may also transmit repetitions of a PUSCH transmission on a different CC than other uplink transmission instances (e.g., one or more regular PUSCH transmissions, repetitions of another PUSCH transmission), possibly within the same slot.

PUSCH repetition Type B may be supported for both dynamic grant (DG) and configured grant (CG). In the case of CG, PUSCH repetition Type B may be supported for Type 1 and/or Type 2. A base station 108 may communicate a PUSCH repetition configuration to a UE 104 by providing a slot configuration and scheduling information. The slot configuration indicates symbols within a time period that are available for uplink transmission, and the base station 108 may provide the slot configuration in, for example, an RRC signaling message or a DCI message. The scheduling information may include a time domain resource allocation (e.g., a time domain resource allocation (TDRA) field) in a DCI message or in a Type 1 CG configuration message), a modulation and coding scheme (MCS), and/or a frequency resource allocation (which may indicate, for example, a number of physical resource blocks (PRBs)) and may be provided, for example, in one or more RRC messages and/or one or more DCI messages. PUSCH repetition Type B may be scheduled by DCI format 0_1 or DCI format 0_2 but typically is not scheduled by DCI format 0_0.

A power headroom report (PHR) may be used to report uplink transmission power status so as to reflect uplink link budget. A PHR is calculated in response to detection of a PHR trigger condition (e.g., as indicated in clause 5.4.6 of 3GPP Technical Specification (TS) 38.321 ("5G; NR; Medium Access Control (MAC) protocol specification," v16.4.0 (2021-04)), such as expiration of a periodic timer or a pathloss change that is greater than a threshold. The UE sends a PHR within a medium access control (MAC) control element (CE) in a PUSCH transmission. PHRs may not be scheduled; rather, a PHR may be sent when the UE has already been allocated resources on the PUSCH for another reason (e.g., for uplink data transmission).

As described in clause 7.7.1 of 3GPP TS 38.213 ("5G; NR; Physical layer procedures for control," v16.5.0 (2021-04)), a UE calculates a PHR to be valid for a PUSCH transmission occasion i on active UL BWP b of carrier f of serving cell c, using a parameter set configuration with index j and a PUSCH power control adjustment state with index 1. Clause 7.7.1 of 3GPP TS 38.213 provides for two different kinds of PHR. The first kind of PHR is actual PHR, in which the PHR is calculated based on an actual PUSCH transmission according to an expression as shown in FIG. 2A, which includes a UE configured maximum output power $P_{CMAX,f,c}(i)$ and a scheduling bandwidth $M_{RB,b,f,c}^{PUSCH}(i)$ (e.g., as described in clause 7.1.1. of 3GPP TS 38.213). The second kind of PHR is virtual PHR, in which the PHR is calculated based on a reference PUSCH transmission according to an expression as shown in FIG. 2B, which includes a reference maximum output power value $\tilde{P}_{CMAX,f,c}(i)$ (e.g., as described in clause 7.7.1. of 3GPP TS 38.213).

If the PUSCH transmission occasion that is to carry the PHR occurs too soon after the PHR trigger condition, the UE may not have sufficient time to calculate an actual PHR. A threshold may be applied to accommodate a PUSCH transmission preparation delay. For example, the threshold may be applied such that if an offset in time between a PHR trigger condition and a PUSCH transmission with PHR exceeds the threshold, the UE reports an actual PHR; otherwise, the UE reports a virtual PHR. For dynamic-grant based PUSCH, the threshold may be the slot with the PDCCH that schedules the PUSCH transmission with PHR. For configured-grant based PUSCH, the threshold may be based on a minimal scheduling delay.

In Release 17 of the 5G specification, it may be desired to support PUSCH repetitions with multi-beam operation, such that repetitions with different beams may be received by one or more transmit-receive points (TRPs). PUSCH repetitions with multi-beam operation is also referred to as "multi-beam PUSCH" herein. In multi-beam PUSCH, the PUSCH repetitions may be multiplexed in time division multiplexing (TDM) manner based on the following types: 1) repetition type A (e.g., each repetition takes one slot); 2) repetition type B (e.g., repetitions are multiplexed in consecutive slots, and more than one repetition can be transmitted in a slot).

For multi-beam PUSCH, the PHR can be quite different in different beams, so that how to calculate the PHR may become unclear. One possible approach is to report N PHRs for N TRPs (e.g., N=2), based on the multi-beam PUSCH.

The PHR calculation may depend on the configuration and transmission status in the corresponding transmission occasion. For a case in which one or more repetitions of a PUSCH transmission are to be sent, the PHR calculation may be based on the configuration and transmission status in the very first transmission occasion (e.g., the initial repetition of the PUSCH transmission). But if the initial repetition is to be sent on a first beam and a later repetition of the PUSCH transmission is to be sent on a second beam, the transmission status for the first repetition of the PUSCH transmission on the second beam may be unknown when the transport block for the PUSCH transmission is prepared, so that the UE may not be able to predict what the transmission status for the second beam will be during the corresponding transmission occasions on the second beam. For such reasons, how to report multiple PHRs by multi-beam PUSCH could be a problem.

FIG. 3 illustrates an example of an issue that may arise. As shown in this example, when preparation of the PUSCH transmission on CC2 begins, the UE has no information yet as to whether there will be a PUSCH transmission on CC 1 during the same slot as PUSCH repetition #3, and the reported PHR can be different depending on whether a PUSCH transmission is to occur on CC 1 during that slot.

Techniques for PHR calculation when more than one PHR are reported by multi-beam PUSCH are described herein and may be implemented to address issues as described above. Techniques for PHR calculation when more than one PHR are reported by multi-beam PUSCH as described herein may include using any of several different options for power headroom (PH) calculation.

When the PHR report for the first beam meets the condition to report an actual PHR, the first PHR may be calculated as an actual PHR based on configuration information (e.g., scheduling bandwidth) for the first PUSCH transmission occasion. For the second PHR, a first option is to calculate the second PHR as a virtual PHR (e.g., based on a reference PUSCH transmission). The power control parameters for virtual PHR calculation can be configured per TRP by higher layer signaling (e.g., RRC signaling or MAC CE). Alternatively, the power control parameters for virtual PHR calculation can be based on the default power control parameters for each TRP (based on a default association between a configured set of power control parameters and the corresponding beam).

Figure 4:
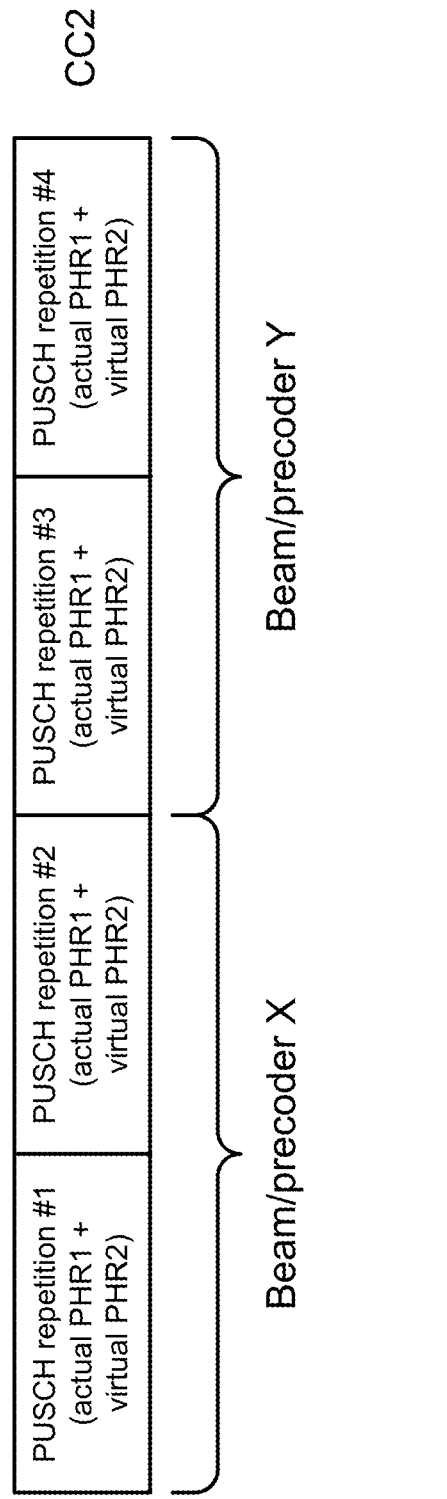
FIG. 4 shows an example of uplink transmissions for which PHR may be calculated based on a first option in accordance with some embodiments.

In one example of this first option, default power control parameters can be as follows: a first set of values {the first value in P0-AlphaSet; the pathloss reference signal (PL-RS) corresponding to PUSCHPathlossReferenceRS-Id=0, and closed-loop index I=0} can be used for TRP1, and a second set of values {the second value in P0-AlphaSet; the PL-RS corresponding to PUSCHPathlossReferenceRS-Id=1; and closed-loop index I=1 if twoPUSCH-PC-AdjustmentStates is configured, I=0 otherwise} can be used for TRP2. In this case, TRP1 corresponds to a beam indicated by a sounding reference signal (SRS) resource indicator (SRI) from the first SRS resource set, and TRP2 corresponds to a beam indicated by an SRI from the second SRS resource set. While some embodiments describe PUSCH transmission on two beams being received by respective TRPs, it is possible for the PUSCH transmissions on more than one beam (e.g., both of two beams) to be received by the same TRP. FIG. 4 shows an example of uplink transmissions for which PHR may be calculated based on the first option in which repetitions #1 and #2 of a PUSCH transmission are on a first beam/precoder X and repetitions #3 and #4 of the PUSCH transmission are on a second beam/precoder Y.

As noted above, when the PHR report for the first beam meets the condition to report an actual PHR, the first PHR may be calculated as an actual PHR based on configuration information (e.g., scheduling bandwidth) for the first PUSCH transmission occasion. For the second PHR, a second option is to calculate the second PHR as an actual PHR based on configuration information (e.g., scheduling bandwidth) for the first PUSCH transmission occasion with the second beam. In this case, when calculating the second PHR, the UE may assume that it will transmit no additional signal in another CC during the first PUSCH transmission occasion with the second beam. Alternatively, the UE may calculate the second PHR according to an assumption that the signal transmission status in other CC(s) during the slot that includes the first PUSCH transmission occasion with the second beam will be the same as during the slot that includes the first PUSCH transmission occasion with the first beam.

Figure 5:
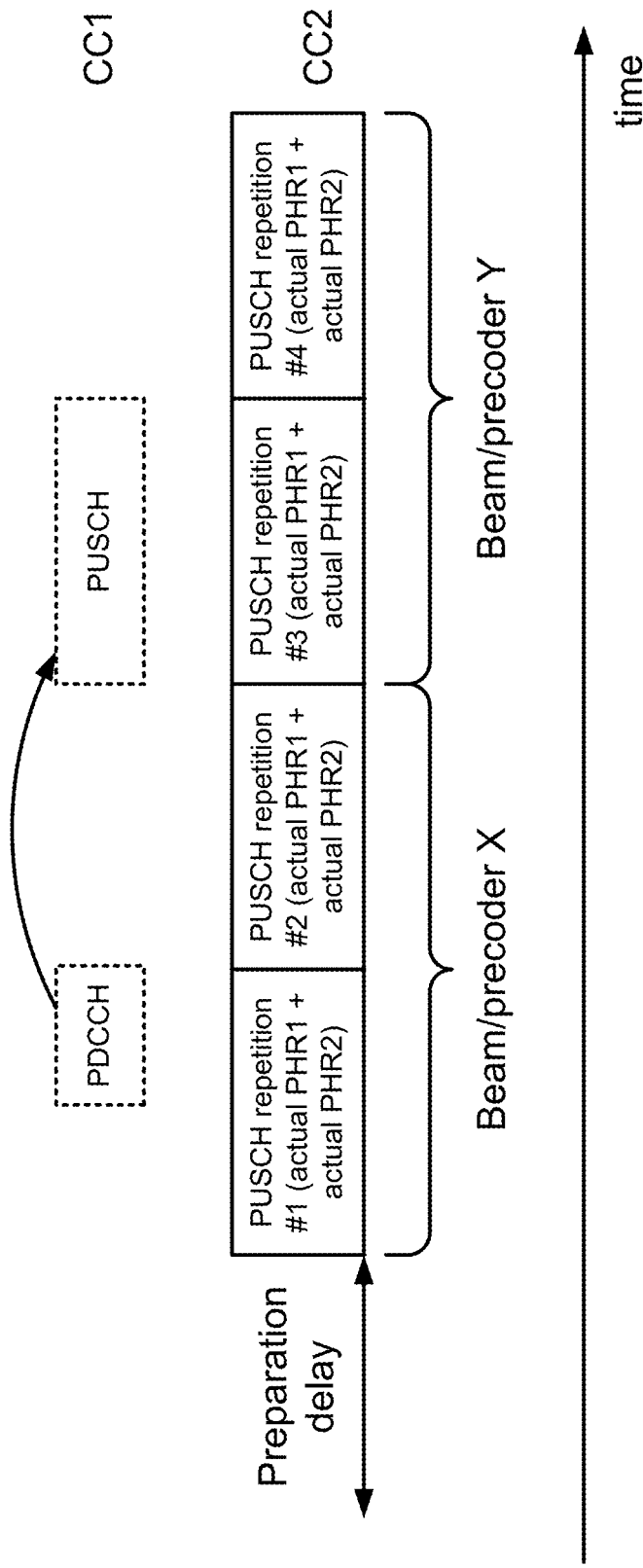
FIG. 5 shows an example of uplink transmissions for which PHR may be calculated based on a second option and a third option in accordance with some embodiments.

An example of uplink transmissions for which PHR may be calculated based on the second option may be understood with reference to FIG. 5. In this example, PHR1 is calculated based on configuration information for repetition #1, and PHR2 is calculated based on configuration information for repetition #3 with an assumption that the UE performs no PUSCH transmission on CC 1 during the slot that includes repetition #3.

As noted above, when the PHR report for the first beam meets the condition to report an actual PHR, the first PHR may be calculated as an actual PHR based on configuration information (e.g., scheduling bandwidth) for the first PUSCH transmission occasion. For the second PHR, a third option is to calculate the second PHR as an actual PHR based on configuration information (e.g., scheduling bandwidth) for the first PUSCH transmission occasion with the first beam. To calculate this second PHR, however, the UE may use power control parameters (e.g., P0, alpha, PL-RS, and/or closed-loop power control parameters) that are based on those indicated for the second beam. Additionally or alternatively, if beam level maximum power reduction (MPR) is enabled, the UE may calculate the second PHR based on the corresponding MPR for the second beam.

An example of uplink transmissions for which PHR may be calculated based on the third option may be understood with reference again to FIG. 5. In this example, PHR1 is calculated based on configuration information for repetition #1 and using power control parameters for beam/precoder X, and PHR2 is calculated based on configuration information for repetition #1 but using power control parameters for beam/precoder Y.

As noted above, when the PHR report for the first beam meets the condition to report an actual PHR, the first PHR may be calculated as an actual PHR based on configuration information (e.g., scheduling bandwidth) for the first PUSCH transmission occasion. For the second PHR, a fourth option is to calculate the second PHR based on the length of a gap between the first repetition on the first beam and the first repetition on the second beam and/or according to the length of a gap between the time of the PHR trigger condition and the first repetition on the second beam. According to this option, if the gap between the first repetition on the first beam and the first repetition on the second beam is within a threshold, and/or if the gap between the time of the PHR trigger condition and the first repetition on the second beam is within a threshold, then the UE may calculate the second PHR as an actual PHR based on configuration information (e.g., scheduling bandwidth) for the first PUSCH transmission occasion with the second beam. If the gap is above the corresponding threshold, then the UE may calculate the second PHR according to the first option, the second option, or the third option as described above, or the UE may calculate both the first PHR and the second PHR as virtual PHRs. The threshold, which may be predefined or may be reported by the UE as a UE capability (e.g., via capability signaling), may be configured to make sure that no other signals will be scheduled after the time at which preparation of the transport block for the PUSCH transmission begins.

Figure 6:
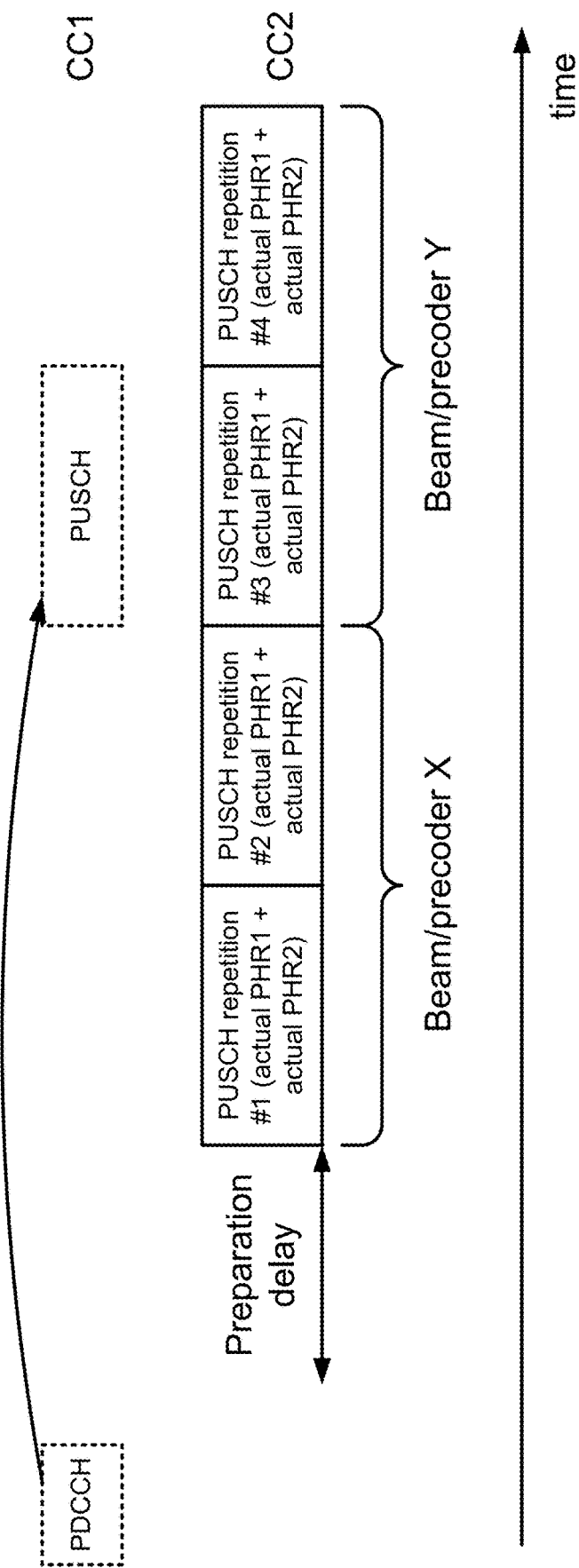
FIG. 6 shows an example of uplink transmissions for which PHR may be calculated based on a fourth option in accordance with some embodiments.
Figure 7:
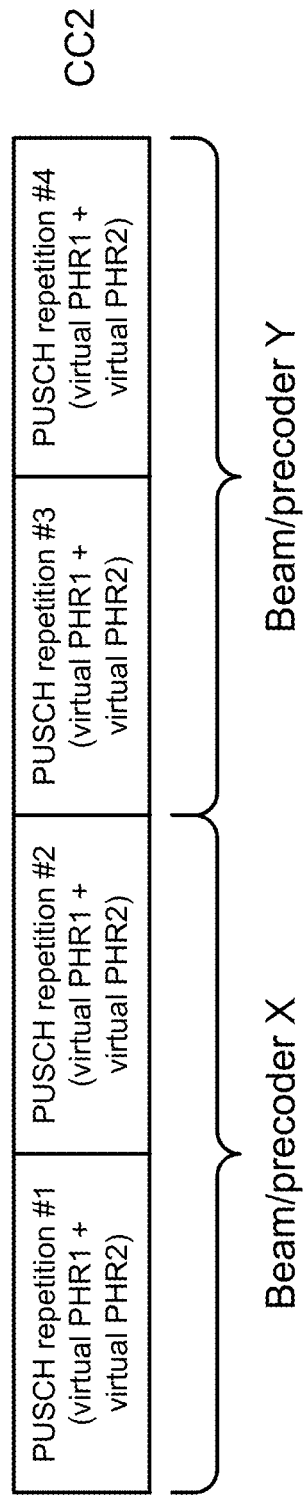
FIG. 7 shows an example of uplink transmissions for which PHR may be calculated based on a fifth option in accordance with some embodiments.

FIG. 6 shows an example of uplink transmissions for which PHR may be calculated based on the fourth option, in which PHR1 is calculated based on configuration information (e.g., scheduling bandwidth) for repetition #1 and PHR3 is calculated based on configuration information (e.g., scheduling bandwidth) for repetition #3. It may be desired for a UE to use the fourth option for repetition type B (e.g., multiple repetitions in one slot), and to use the first option, the second option, or the third option as described above for repetition type A (e.g., one repetition per slot).

Several options that may be used for PH calculation when the PHR report for the first beam meets the condition to report an actual PHR are described above. In a fifth option, the UE calculates both the first PHR and the second PHR as virtual PHRs. In this case, the UE may calculate each virtual PHR based on default power control parameters or based on power control parameters configured for the respective TRP. FIG. 6 shows an example of uplink transmissions for which PHR may be calculated based on the fifth option.

Several options for reporting PHR in multi-beam PUSCH are described above. In another approach, the UE does not report PHR in multi-beam PUSCH. For example, such an approach may comprise reporting PHR only in PUSCH with single-beam operation. Alternatively, whether to report PHR by multi-beam PUSCH may be indicated as a UE capability, which the UE may communicate to the gNB using capability signaling.

Several different options are now described for reporting a first PHR and a second PHR that have been calculated by a UE as described above. In a first reporting option, the UE only reports one PHR in multi-beam PUSCH. In this case, the UE can report the minimum of the two PHRs, the maximum of the two PHRs, an average (e.g., mean) of the two PHRs, or the first PHR (e.g., the PHR corresponding to the initial repetition of the PUSCH transmission).

In a second reporting option, the UE only reports two PHRs in multi-beam PUSCH. In a third reporting option, whether the UE is to use the first reporting option (e.g., to report only one PHR) or the second reporting option (e.g., to report both PHRs) may be configured by the gNB (e.g., via RRC signaling) or reported as a UE capability.

In a fourth reporting option, the gNB may configure separate triggering conditions for the first and second PHRs (e.g., via RRC signaling, MAC CE, and/or DCI), and whether the UE is to report one PHR or two PHRs may be determined by which PHR trigger conditions have occurred. If a trigger condition for the first PHR and a trigger condition for the second PHR occur simultaneously, then the UE may use any of the first, second, or third reporting options as described above. In one example, a PHR trigger condition is that the pathloss variation for the TRP exceeds a threshold, which can be configured for each TRP separately. In another example, PHR for a beam may be triggered if the UE detects a maximum power emission (MPE) event for the beam (e.g., that MPE variation for the beam exceeds a threshold) while beam level MPE is enabled.

If a common triggering condition is configured, the PHR report can be triggered when a condition of pathloss or MPE variation for both TRPs or for one of the TRPs is met. In this case, any of the first, second, or third reporting options as described above may be used to report the PHR.

Figure 8:
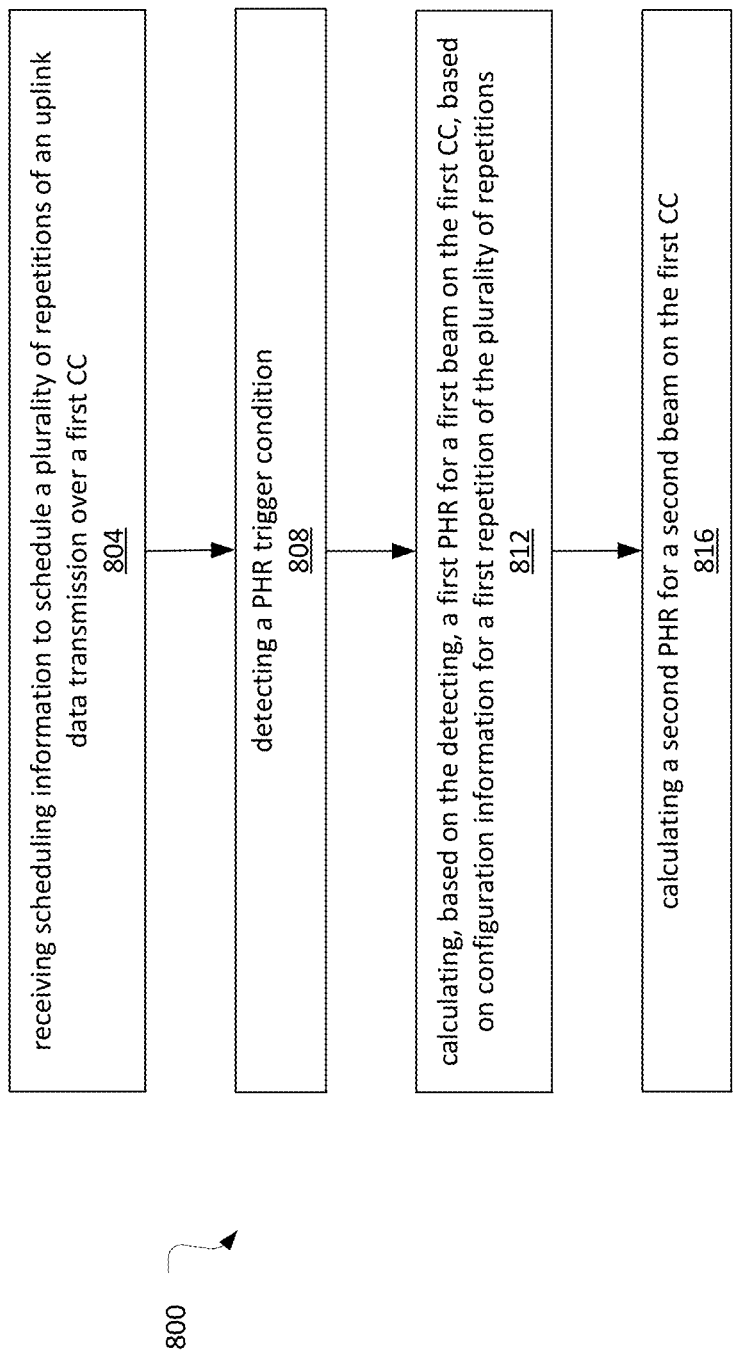
FIG. 8 illustrates an operational flow/algorithmic structure in accordance with some embodiments.

FIG. 8 illustrates an operation flow/algorithmic structure 800 in accordance with some embodiments. The operation flow/algorithmic structure 800 may be performed or implemented by a UE such as, for example, UE 104 or UE 1100; or components thereof, for example, baseband processor 1104A.

The operation flow/algorithmic structure 800 may include, at block 804, receiving scheduling information to schedule a plurality of repetitions of an uplink data transmission over a first CC. The scheduling information may indicate that the repetitions are to be PUSCH repetitions Type B. The scheduling information may indicate that a repetition among the plurality of repetitions is to be transmitted on a first beam and that another repetition among the plurality of repetitions is to be transmitted on a second beam.

The operation flow/algorithmic structure 800 may include, at block 808, detecting a power headroom report (PHR) trigger condition. The condition may be, for example, expiration of a timer or that a threshold (e.g., a pathloss threshold, an MPE threshold) is exceeded.

The operation flow/algorithmic structure 800 may include, at block 812, calculating, based on the detecting, a first PHR for a first beam on the first CC, based on configuration information for a first repetition of the plurality of repetitions. The first PHR may be an actual PHR or a virtual PHR. The first PHR may be based on an actual PUSCH transmission or a reference PUSCH transmission.

The operation flow/algorithmic structure 800 may include, at block 816, calculating a second PHR for a second beam on the first CC. The second PHR may be an actual PHR or a virtual PHR. The second PHR may be based on an actual PUSCH transmission or a reference PUSCH transmission. The second PHR may be based on a power control parameter (PCP) determined for a beam. Determining the PCP may include receiving the PCP in RRC or MAC CE signaling; or determining the PCP based on a default association between a configured set of PCPs and the second beam.

Figure 9:
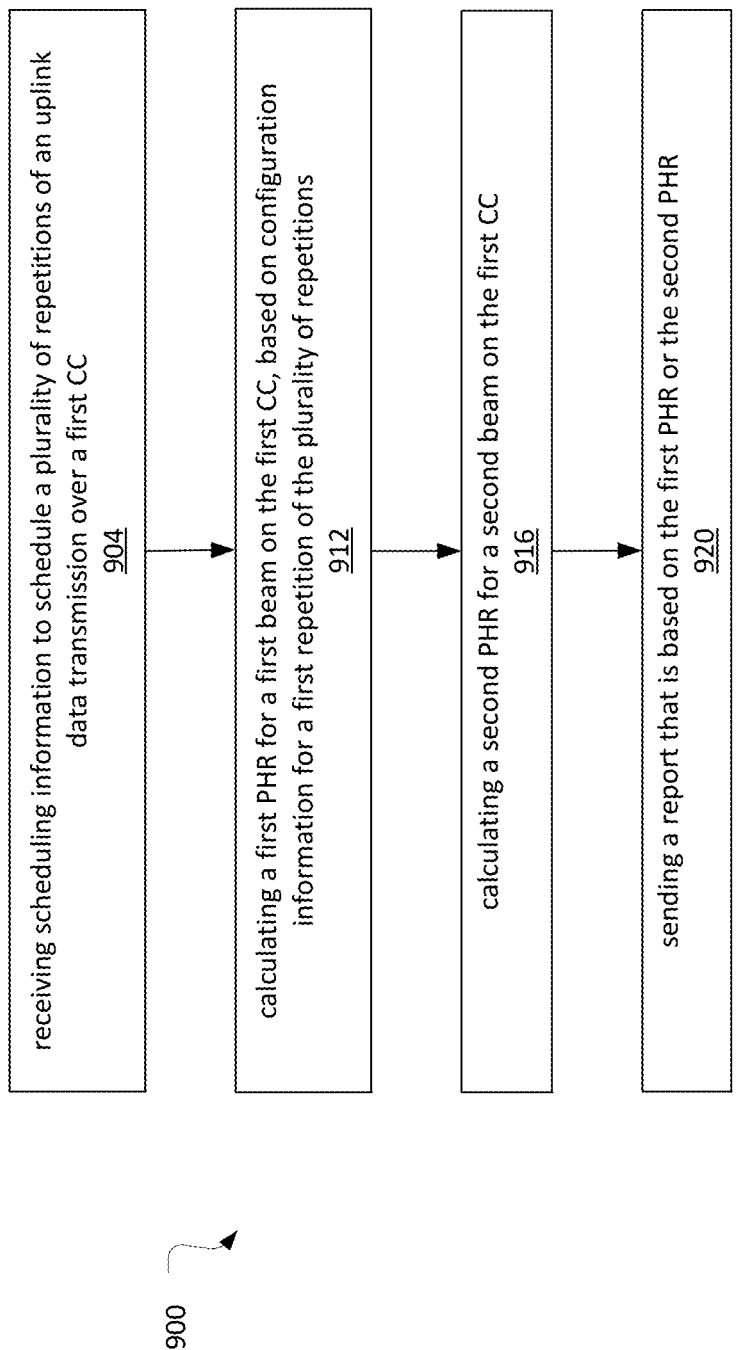
FIG. 9 illustrates an operational flow/algorithmic structure in accordance with some embodiments.

FIG. 9 illustrates an operation flow/algorithmic structure 900 in accordance with some embodiments. The operation flow/algorithmic structure 900 may be performed or implemented by a UE such as, for example, UE 104 or UE 1100; or components thereof, for example, baseband processor 1104A.

The operation flow/algorithmic structure 900 may include, at block 904, receiving scheduling information to schedule a plurality of repetitions of an uplink data transmission over a first CC. The scheduling information may indicate that the repetitions are to be PUSCH repetitions Type B. The scheduling information may indicate that a repetition among the plurality of repetitions is to be transmitted on a first beam and that another repetition among the plurality of repetitions is to be transmitted on a second beam.

The operation flow/algorithmic structure 900 may include, at block 912, calculating a first PHR for a first beam on the first CC, based on configuration information for a first repetition of the plurality of repetitions. The first PHR may be an actual PHR or a virtual PHR. The first PHR may be based on an actual PUSCH transmission or a reference PUSCH transmission.

The operation flow/algorithmic structure 900 may include, at block 916, calculating a second PHR for a second beam on the first CC. The second PHR may be an actual PHR or a virtual PHR. The second PHR may be based on an actual PUSCH transmission or a reference PUSCH transmission. The second PHR may be based on a power control parameter (PCP) determined for a TRP. Determining the PCP may include receiving the PCP in RRC or MAC CE signaling; or determining the PCP based on a default association between a configured set of PCPs and the second beam.

The operation flow/algorithmic structure 900 may include, at block 920, sending a report that is based on the first PHR or the second PHR. The report may include the first PHR or the second PHR. The report may include neither the first PHR nor the second PHR. The report may include a minimum among the first PHR and the second PHR, a maximum among the first PHR and the second PHR, or an average (e.g., mean) of the first PHR and the second PHR. The report may be based on the first PHR, and block 920 may further include sending a second report that is based on the second PHR. A number of reports may be based on a capability of the UE or may be configured by RRC or MAC CE signaling. Structure 900 may further include receiving first configuration information for a PHR trigger condition for the first beam and/or receiving second configuration information for a PHR trigger condition for the second beam.

Figure 10:
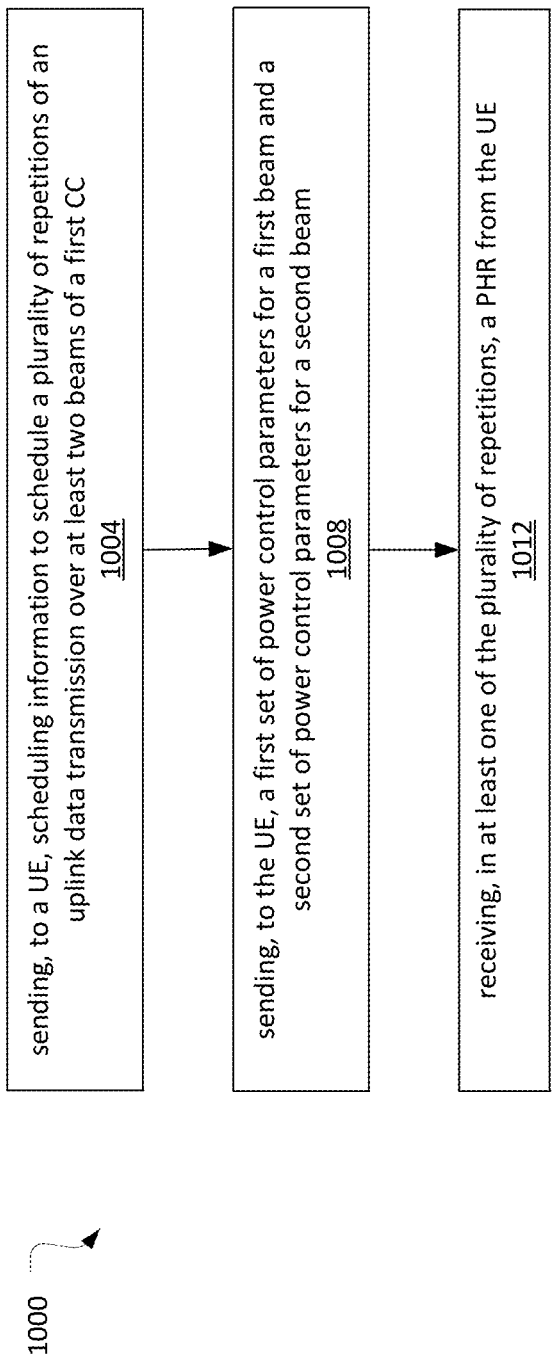
FIG. 10 illustrates an operational flow/algorithmic structure in accordance with some embodiments.

FIG. 10 illustrates an operation flow/algorithmic structure 1000 in accordance with some embodiments. The operation flow/algorithmic structure 1000 may be performed or implemented by a base station such as, for example, base station 108 or 1200; or components thereof, for example, baseband processor 1204A.

The operation flow/algorithmic structure 1000 may include, at block 1004, sending, to a UE, scheduling information to schedule a plurality of repetitions of an uplink data transmission over at least two beams of a first carrier. The scheduling information may indicate that the repetitions are to be PUSCH repetitions Type B. The scheduling information may indicate that a repetition among the plurality of repetitions is to be transmitted on a first beam among the at least two beams and that another repetition among the plurality of repetitions is to be transmitted on a second beam among the at least two beams.

The operation flow/algorithmic structure 1000 may include, at block 1008, sending, to the UE, a first set of power control parameters for the first beam and a second set of power control parameters for the second beam. The sending may be performed using, for example, RRC or MAC CE signaling.

The operation flow/algorithmic structure 1000 may include, at block 1012, receiving, in at least one of the plurality of repetitions, a power headroom report (PHR) from the UE. The report may include one PHR, or a first PHR and a second PHR. Structure 900 may further include sending, to the UE, configuration information indicating a number of PHRs to be included in the report by RRC or MAC CE signaling. Structure 900 may include receiving a number of PHRs to be included in the report from the UE via capability signaling. Structure 900 may further include sending, to the UE, first configuration information for a PHR trigger condition for the first beam (e.g., a pathloss threshold and/or an MPE threshold) and/or sending second configuration information for a PHR trigger condition for the second beam (e.g., a pathloss threshold and/or an MPE threshold).

Figure 11:
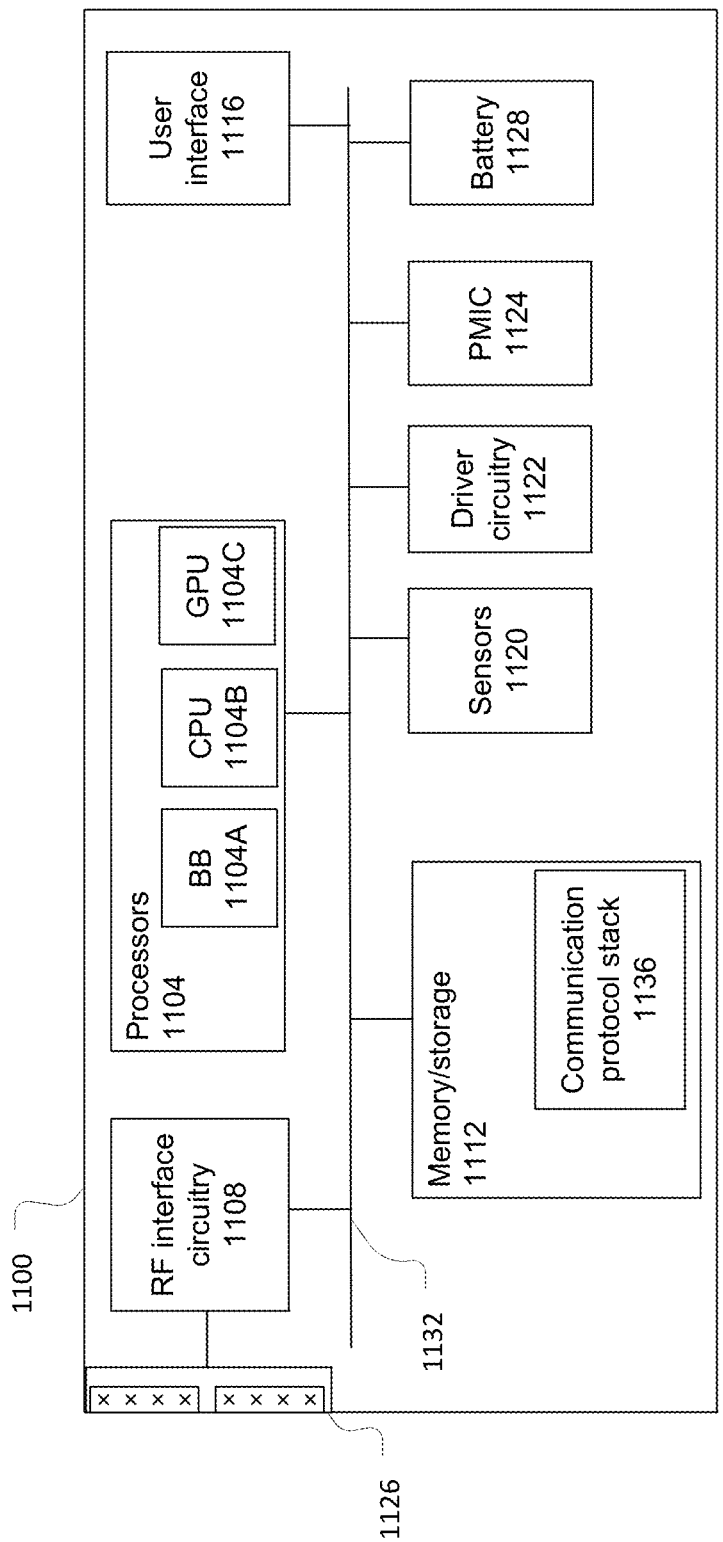
FIG. 11 illustrates a user equipment in accordance with some embodiments.

FIG. 11 illustrates a UE 1100 in accordance with some embodiments. The UE 1100 may be similar to and substantially interchangeable with UE 104 of FIG. 1.

The UE 1100 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices (for example, a smart watch), relaxed-IoT devices.

The UE 1100 may include processors 1104, RF interface circuitry 1108, memory/storage 1112, user interface 1116, sensors 1120, driver circuitry 1122, power management integrated circuit (PMIC) 1124, antenna structure 1126, and battery 1128. The components of the UE 1100 may be implemented as integrated circuits (ICs), portions thereof, discrete electronic devices, or other modules, logic, hardware, software, firmware, or a combination thereof. The block diagram of FIG. 11 is intended to show a high-level view of some of the components of the UE 1100. However, some of the components shown may be omitted, additional components may be present, and different arrangement of the components shown may occur in other implementations.

The components of the UE 1100 may be coupled with various other components over one or more interconnects 1132, which may represent any type of interface, input/output, bus (local, system, or expansion), transmission line, trace, optical connection, etc. that allows various circuit components (on common or different chips or chipsets) to interact with one another.

The processors 1104 may include processor circuitry such as, for example, baseband processor circuitry (BB) 1104A, central processor unit circuitry (CPU) 1104B, and graphics processor unit circuitry (GPU) 1104C. The processors 1104 may include any type of circuitry or processor circuitry that executes or otherwise operates computer-executable instructions, such as program code, software modules, or functional processes from memory/storage 1112 to cause the UE 1100 to perform operations as described herein.

In some embodiments, the baseband processor circuitry 1104A may access a communication protocol stack 1136 in the memory/storage 1112 to communicate over a 3GPP compatible network. In general, the baseband processor circuitry 1104A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some embodiments, the PHY layer operations may additionally/alternatively be performed by the components of the RF interface circuitry 1108.

The baseband processor circuitry 1104A may generate or process baseband signals or waveforms that carry information in 3GPP-compatible networks. In some embodiments, the waveforms for NR may be based cyclic prefix OFDM "CP-OFDM" in the uplink or downlink, and discrete Fourier transform spread OFDM "DFT-S-OFDM" in the uplink.

The memory/storage 1112 may include one or more non-transitory, computer-readable media that includes instructions (for example, communication protocol stack 1136) that may be executed by one or more of the processors 1104 to cause the UE 1100 to perform various operations described herein. The memory/storage 1112 include any type of volatile or non-volatile memory that may be distributed throughout the UE 1100. In some embodiments, some of the memory/storage 1112 may be located on the processors 1104 themselves (for example, L1 and L2 cache), while other memory/storage 1112 is external to the processors 1104 but accessible thereto via a memory interface. The memory/storage 1112 may include any suitable volatile or non-volatile memory such as, but not limited to, dynamic random access memory (DRAM), static random access memory (SRAM), erasable programmable read only memory (EPROM), electrically erasable programmable read only memory (EEPROM), Flash memory, solid-state memory, or any other type of memory device technology.

The RF interface circuitry 1108 may include transceiver circuitry and radio frequency front module (RFEM) that allows the UE 1100 to communicate with other devices over a radio access network. The RF interface circuitry 1108 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 1126 and proceed to filter and amplify (with a low-noise amplifier) the signal. The signal may be provided to a receiver of the transceiver that down-converts the RF signal into a baseband signal that is provided to the baseband processor of the processors 1104.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1126.

In various embodiments, the RF interface circuitry 1108 may be configured to transmit/receive signals in a manner compatible with NR access technologies.

The antenna 1126 may include antenna elements to convert electrical signals into radio waves to travel through the air and to convert received radio waves into electrical signals. The antenna elements may be arranged into one or more antenna panels. The antenna 1126 may have antenna panels that are omnidirectional, directional, or a combination thereof to enable beamforming and multiple input, multiple output communications. The antenna 1126 may include microstrip antennas, printed antennas fabricated on the surface of one or more printed circuit boards, patch antennas, phased array antennas, etc. The antenna 1126 may have one or more panels designed for specific frequency bands including bands in FR1 or FR2.

The user interface circuitry 1116 includes various input/output (I/O) devices designed to enable user interaction with the UE 1100. The user interface 1116 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs, or more complex outputs such as display devices or touchscreens (for example, liquid crystal displays "LCDs," LED displays, quantum dot displays, projectors, etc.), with the output of characters, graphics, multimedia objects, and the like being generated or produced from the operation of the UE 1100.

The sensors 1120 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 1122 may include software and hardware elements that operate to control particular devices that are embedded in the UE 1100, attached to the UE 1100, or otherwise communicatively coupled with the UE 1100. The driver circuitry 1122 may include individual drivers allowing other components to interact with or control various input/output (I/O) devices that may be present within, or connected to, the UE 1100. For example, driver circuitry 1122 may include a display driver to control and allow access to a display device, a touchscreen driver to control and allow access to a touchscreen interface, sensor drivers to obtain sensor readings of sensor circuitry 1120 and control and allow access to sensor circuitry 1120, drivers to obtain actuator positions of electro-mechanic components or control and allow access to the electro-mechanic components, a camera driver to control and allow access to an embedded image capture device, audio drivers to control and allow access to one or more audio devices.

The PMIC 1124 may manage power provided to various components of the UE 1100. In particular, with respect to the processors 1104, the PMIC 1124 may control power-source selection, voltage scaling, battery charging, or DC-to-DC conversion.

In some embodiments, the PMIC 1124 may control, or otherwise be part of, various power saving mechanisms of the UE 1100 including DRX as discussed herein.

A battery 1128 may power the UE 1100, although in some examples the UE 1100 may be mounted deployed in a fixed location, and may have a power supply coupled to an electrical grid. The battery 1128 may be a lithium ion battery, a metal-air battery, such as a zinc-air battery, an aluminum-air battery, a lithium-air battery, and the like. In some implementations, such as in vehicle-based applications, the battery 1128 may be a typical lead-acid automotive battery.

Figure 12:
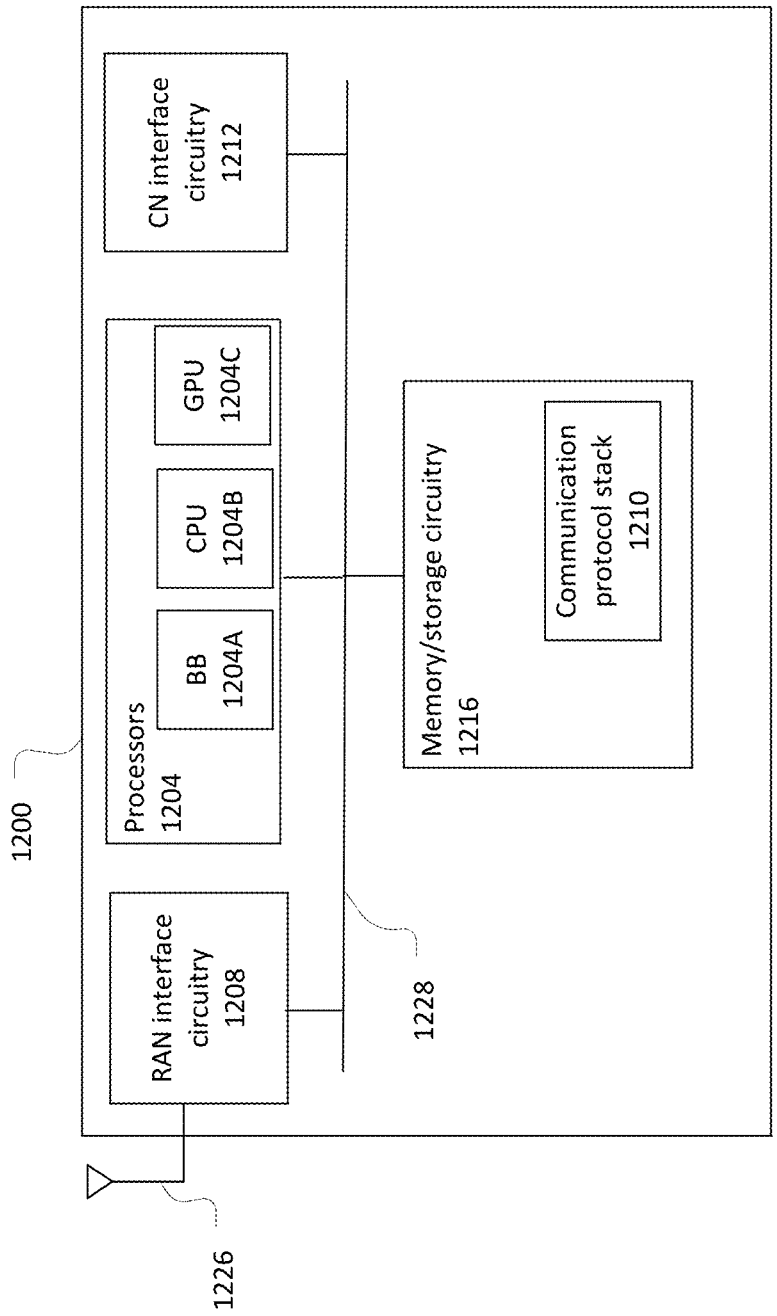
FIG. 12 illustrates a base station in accordance with some embodiments.

FIG. 12 illustrates an access node 1200 (e.g., a base station or gNB) in accordance with some embodiments. The access node 1200 may be similar to and substantially interchangeable with access node 108.

The access node 1200 may include processors 1204, RF interface circuitry 1208, core network (CN) interface circuitry 1212, memory/storage circuitry 1216, and antenna structure 1226.

The components of the access node 1200 may be coupled with various other components over one or more interconnects 1228.

The processors 1204, RF interface circuitry 1208, memory/storage circuitry 1216 (including communication protocol stack 1210), antenna structure 1226, and interconnects 1228 may be similar to like-named elements shown and described with respect to FIG. 11.

The CN interface circuitry 1212 may provide connectivity to a core network, for example, a 5$^{th}$ Generation Core network (5GC) using a 5GC-compatible network interface protocol such as carrier Ethernet protocols, or some other suitable protocol. Network connectivity may be provided to/from the access node 1200 via a fiber optic or wireless backhaul. The CN interface circuitry 1212 may include one or more dedicated processors or FPGAs to communicate using one or more of the aforementioned protocols. In some implementations, the CN interface circuitry 1212 may include multiple controllers to provide connectivity to other networks using the same or different protocols.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Example 1 includes a method of operating a UE, the method comprising receiving scheduling information to schedule a plurality of repetitions of an uplink data transmission over a first (CC); detecting a PHR trigger condition; calculating, based on the detecting, a first PHR for a first beam on the first CC based on configuration information for a first repetition of the plurality of repetitions; and calculating a second PHR for a second beam on the first CC.

Example 2 includes the method of Example 1 or some other example herein, wherein the second PHR is a virtual PHR.

Example 3 includes the method of Example 2 or some other example herein, wherein the first PHR is based on an actual physical uplink shared channel (PUSCH) transmission or a reference PUSCH transmission.

Example 4 includes the method of Example 2 or some other example herein, further comprising determining a power control parameter for a beam, wherein calculating the second PHR is based on the power control parameter.

Example 5 includes the method of Example 4 or some other example herein, wherein determining the power control parameter comprises receiving the power control parameter in radio resource control (RRC) or media access control (MAC) control element (CE) signaling; or determining the power control parameter based on a default association between a configured set of power control parameters and the second beam.

Example 6 includes the method of Example 1 or some other example herein, wherein calculating the second PHR is based on configuration information for a second repetition of the plurality of repetitions, wherein the second repetition is to occur on the second beam.

Example 7 includes the method of Example 6 or some other example herein, wherein calculating the second PHR is based on an assumption of no uplink data transmission by the UE over a second CC during the second repetition.

Example 8 includes the method of Example 6 or some other example herein, wherein calculating the second PHR is based on an assumption that an uplink data transmission status of the UE over a second CC during the second repetition is equivalent to an uplink data transmission status of the UE over the second CC during the first repetition.

Example 9 includes the method of Example 6 or some other example herein, wherein calculating the second PHR is based on a length of a gap between the first repetition and the second repetition.

Example 10 includes the method of Example 6 or some other example herein, wherein calculating the second PHR is based on a length of a gap between a time of detecting the PHR trigger condition and the second repetition.

Example 11 includes the method of Example 10 or some other example herein, wherein calculating the second PHR is based on a relation between a threshold and the length of the gap, and wherein the method further comprises sending an indication of a capability of the UE, wherein the capability includes the threshold.

Example 12 includes the method of Example 1 or some other example herein, wherein calculating the second PHR is based on the configuration information for the first repetition.

Example 13 includes one or more computer-readable media having instructions that, when executed by one or more processors, cause a UE to receive scheduling information to schedule a plurality of repetitions of an uplink data transmission over a first CC; calculate a first PHR for a first beam on the first CC, based on configuration information for a first repetition of the plurality of repetitions; calculate a second PHR for a second beam on the first CC; and send a report that is based on the first PHR or the second PHR.

Example 14 includes the or more computer-readable media of Example 13 or some other example herein, wherein the report is based on the first PHR, and the instructions, when executed by the one or more processors, further cause the UE to send a second report that is based on the second PHR.

Example 15 includes the one or more computer-readable media of Example 14 or some other example herein, wherein the instructions, when executed by the one or more processors, further cause the UE to send a message indicating a capability of the UE to send the second report.

Example 16 includes the one or more computer-readable media of Example 13 or some other example herein, wherein the report does not include the first PHR or the second PHR.

Example 17 includes the one or more computer-readable media of Example 13 or some other example herein, wherein the report includes a minimum among the first PHR and the second PHR, a maximum among the first PHR and the second PHR, or an average of the first PHR and the second PHR.

Example 18 includes the one or more computer-readable media of Example 13 or some other example herein, wherein the instructions, when executed by one or more processors, further cause the user equipment to receive first configuration information for a PHR trigger condition for the first beam; and second configuration information for a PHR trigger condition for the second beam.

Example 19 includes a base station comprising processing circuitry to send, to a UE, scheduling information to schedule a plurality of repetitions of an uplink data transmission over at least two beams of a CC; send, to the UE, a first set of power control parameters for a first beam among the at least two beams and a second set of power control parameters for a second beam among the at least two beams; and receive, in at least one of the plurality of repetitions, a PHR from the UE, memory coupled to the processing circuitry, the memory to store the PHR.

Example 20 includes the base station of Example 19 or some other example herein, wherein the processing circuitry is to send, to the UE, first configuration information for a PHR trigger condition for the first beam, and second configuration information for a PHR trigger condition for the second beam.

Example 21 includes the base station of Example 20 or some other example herein, wherein the first configuration information is to indicate a first pathloss threshold, and the second configuration information is to indicate a second pathloss threshold that is different than the first pathloss threshold.

Example 22 includes the base station of Example 20 or some other example herein, wherein the first configuration information is to indicate a first maximum power emission (MPE) threshold, and the second configuration information is to indicate a second MPE threshold that is different than the first MPE threshold.

Example 23 includes the base station of Example 19 or some other example herein, wherein the processing circuitry is to send, to the UE, configuration information to indicate a number of PHRs to be transmitted.

Example 24 may include an apparatus comprising means to perform one or more elements of a method described in or related to any of examples 1-23, or any other method or process described herein.

Example 25 may include one or more non-transitory computer-readable media comprising instructions to cause an electronic device, upon execution of the instructions by one or more processors of the electronic device, to perform one or more elements of a method described in or related to any of examples 1-23, or any other method or process described herein.

Example 26 may include an apparatus comprising logic, modules, or circuitry to perform one or more elements of a method described in or related to any of examples 1-23, or any other method or process described herein.

Example 27 may include a method, technique, or process as described in or related to any of examples 1-23, or portions or parts thereof.

Example 28 may include an apparatus comprising: one or more processors and one or more computer-readable media comprising instructions that, when executed by the one or more processors, cause the one or more processors to perform the method, techniques, or process as described in or related to any of examples 1-23, or portions thereof.

Example 29 may include a signal as described in or related to any of examples 1-23, or portions or parts thereof.

Example 30 may include a datagram, information element, packet, frame, segment, PDU, or message as described in or related to any of examples 1-23, or portions or parts thereof, or otherwise described in the present disclosure.

Example 31 may include a signal encoded with data as described in or related to any of examples 1-23, or portions or parts thereof, or otherwise described in the present disclosure.

Example 32 may include a signal encoded with a datagram, IE, packet, frame, segment, PDU, or message as described in or related to any of examples 1-23, or portions or parts thereof, or otherwise described in the present disclosure.

Example 33 may include an electromagnetic signal carrying computer-readable instructions, wherein execution of the computer-readable instructions by one or more processors is to cause the one or more processors to perform the method, techniques, or process as described in or related to any of examples 1-23, or portions thereof.

Example 34 may include a computer program comprising instructions, wherein execution of the program by a processing element is to cause the processing element to carry out the method, techniques, or process as described in or related to any of examples 1-23, or portions thereof.

Example 35 may include a signal in a wireless network as shown and described herein.

Example 36 may include a method of communicating in a wireless network as shown and described herein.

Example 37 may include a system for providing wireless communication as shown and described herein.

Example 38 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:
processing scheduling information, received from a base station, to schedule a plurality of repetitions of an uplink data transmission over a first component carrier (CC);
detecting, by a user equipment (UE), a power headroom report (PHR) trigger condition;
calculating, based on the detecting, a first power headroom value for a first actual repetition of the plurality of repetitions;
calculating a second power headroom value for a second actual repetition of the plurality of repetitions, wherein calculating the second power headroom value is based on:
an assumption of no uplink data transmission by the UE over a second CC during the second actual repetition, or
an assumption that an uplink data transmission status of the UE over a second CC during the second actual repetition is equivalent to an uplink data transmission status of the UE over the second CC during the first actual repetition; and
generating a report, for transmission to the base station, including a first PHR based on the first power headroom value and a second PHR based on the second power headroom value.

2. The method of claim 1, wherein the first actual repetition is an actual physical uplink shared channel (PUSCH) transmission.

3. The method of claim 1, wherein calculating the second power headroom value is based on a length of a gap between the first actual repetition and the second actual repetition or is based on a length of a gap between a time of detecting the PHR trigger condition and the second actual repetition.

4. The method of claim 1, wherein calculating the second power headroom value is based on a relation between a threshold and a length of a gap between a time of detecting the PHR trigger condition and the second actual repetition, and
wherein the method further comprises:
generating an indication of a capability of the UE, to be transmitted to the base station, wherein the capability includes the threshold.

5. The method of claim 1, wherein detecting the PHR trigger condition comprises:
detecting that a pathloss change exceeds a threshold.

6. One or more non-transitory computer-readable media having instructions that, when executed, cause processing circuitry to:
obtain, by a user equipment (UE), scheduling information to schedule a plurality of repetitions of an uplink data transmission over a first component carrier (CC);
calculate a first power headroom value, based on configuration information for a first actual repetition of the plurality of repetitions;
calculate a second power headroom value for a second actual repetition of the plurality of repetitions, wherein calculating the second power headroom value is based on:
an assumption of no uplink data transmission by the UE over a second CC during the second actual repetition, or
an assumption that an uplink data transmission status of the UE over a second CC during the second actual repetition is equivalent to an uplink data transmission status of the UE over the second CC during the first actual repetition; and
generate, for transmission to a base station, a report including a first power headroom report (PHR) based on the first power headroom value and a second PHR based on the second power headroom value.

7. The one or more non-transitory computer-readable media of claim 6, wherein the instructions, when executed, further cause the processing circuitry to generate a message indicating a capability of the UE to send the second PHR.

8. The one or more non-transitory computer-readable media of claim 6, wherein the instructions, when executed, further cause the processing circuitry to obtain:
first configuration information for a PHR trigger condition for a first beam; and
second configuration information for a PHR trigger condition for a second beam.

9. An apparatus comprising:
processing circuitry to:
process scheduling information, received from a base station, to schedule a plurality of repetitions of an uplink data transmission over a first component carrier (CC);
detect a power headroom report (PHR) trigger condition;
calculate, based on the detecting, a first power headroom value for a first actual repetition of the plurality of repetitions;
calculate a second power headroom value for a second actual repetition of the plurality of repetitions, wherein calculating the second power headroom value is based on:
an assumption of no uplink data transmission by a user equipment (UE) over a second CC during the second actual repetition, or
an assumption that an uplink data transmission status of the UE over a second CC during the second actual repetition is equivalent to an uplink data transmission status of the UE over the second CC during the first actual repetition; and
generate, for transmission to the base station, a first PHR based on the first power headroom value and a second PHR based on the second power headroom value; and
memory interface circuitry, coupled with the processing circuitry, to store the scheduling information in memory.

10. The apparatus of claim 9, wherein the first actual repetition is an actual physical uplink shared channel (PUSCH) transmission.

11. The apparatus of claim 9, wherein calculating the second power headroom value is based on a length of a gap between the first actual repetition and the second actual repetition or is based on a length of a gap between a time of detecting the PHR trigger condition and the second actual repetition.

12. The apparatus of claim 9, wherein calculating the second power headroom value is based on a relation between a threshold and a length of a gap between a time of detecting the PHR trigger condition and the second actual repetition, and
wherein the processing circuitry is further to:
generate an indication of a capability of the UE, to be transmitted to the base station, wherein the capability includes the threshold.

13. The apparatus of claim 9, wherein to detect the PHR trigger condition, the processing circuitry is further to:
detect that a pathloss change exceeds a threshold.

* * * * *